(12) United States Patent
Liu

(10) Patent No.: US 7,817,309 B2
(45) Date of Patent: Oct. 19, 2010

(54) DOUBLE FILTER FAX COVER PAGE

(75) Inventor: Yue Liu, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1010 days.

(21) Appl. No.: 11/598,922

(22) Filed: Nov. 13, 2006

(65) Prior Publication Data

US 2008/0112015 A1    May 15, 2008

(51) Int. Cl.
*H04N 1/00* (2006.01)
*H04N 1/32* (2006.01)

(52) U.S. Cl. ......................... 358/400; 358/468

(58) Field of Classification Search .................. 358/1.9, 358/2.1, 1.18, 3.28, 400, 402, 468, 1.15; 715/501.1, 513
See application file for complete search history.

(56) References Cited

U.S. PATENT DOCUMENTS

| 7,133,142 | B2* | 11/2006 | Matsuura et al. | ........... 358/1.13 |
| 2003/0163370 | A1* | 8/2003 | Chen et al. | ..................... 705/14 |
| 2004/0061888 | A1* | 4/2004 | Braun et al. | ............... 358/1.15 |
| 2004/0078752 | A1* | 4/2004 | Johnson, Jr. | ............. 715/501.1 |
| 2004/0218226 | A1* | 11/2004 | Antognini et al. | ........... 358/402 |
| 2007/0201101 | A1* | 8/2007 | Corona et al. | ............... 358/400 |
| 2008/0098314 | A1* | 4/2008 | Sharfman | .................... 715/762 |

\* cited by examiner

*Primary Examiner*—Jerome Grant, II
(74) *Attorney, Agent, or Firm*—Hickman Palermo Truong & Becker LLP; Edward A. Becker

(57) ABSTRACT

An approach is provided wherein a banner page is detected and modified to insert information appropriate for a fax cover page. According to one embodiment, a user submits a document to the OS printing sub-system with a banner page option enabled. The banner page is processed by a fax cover filter which detects the banner page and modifies the banner page to include fax cover page information. The banner page and the document are then rendered to a specified document format by the printing subsystem and faxed, for example by a MFP.

24 Claims, 3 Drawing Sheets

DOUBLE FILTER FAX COVER PAGE

FIELD OF THE INVENTION

This invention relates generally to electronic document generation, and more specifically, to an approach for creating fax cover pages.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Facsimile (fax) technology has long been a popular approach for electronic transmission of documents. While electronic mail (e-mail) has become a dominant form of electronic communication, faxing documents remains an extremely popular approach.

Advantages of faxing documents are apparent when a user seeks to transmit a document via electronic means. One approach to transmit a document electronically is to scan the document, save the file generated by the scanner, attach the file to an e-mail and send the e-mail. This approach is cumbersome and prone to errors, such as attaching an incorrect file. Problems may exist with the reception of the e-mail; for example, the recipient may be unable or unwilling to receive file attachments because of the potential of virus infection. The attachment may be in a format unrecognized by the recipient, or the recipient may not have the necessary software to read the attachment. Font conflicts may make the scanned document look different than the original when the scanned document is opened on the recipient's computer. If an attachment is large, it may take significant time to transmit and may exceed the designated amount of storage for recipient's e-mail.

In large part, faxing approaches do not suffer from these shortcomings. A document may be generated and then transmitted via fax in quick succession. Because the document is converted to a format understood by the receiving fax device and the fax is printed directly at the receiving fax device, the document is accurately reproduced. There is no need for the recipient to download an e-mail attachment, scan the attachment for viruses, open the attachment in a program, and then print the document locally.

Many documents currently are generated using computer technology, and most modern computers have networking capability, either through a modem or high-speed networking technology such as Ethernet and TCP/IP. One approach to faxing documents from a personal computer utilizing networking technologies allows users to create a document that is converted to a fax format and transmit the document through a multi-function printing device (MFP) to a receiving fax device instead of printing the document and using a separate fax machine to transmit the document.

It is common for a user to generate a fax cover page to identify various information about a fax, such as: the sender's name, sender's phone and Fax number, recipient's name and phone number, and the number of pages transmitted. One approach to sending a fax from a personal computer including the creation of a cover page starts with a user creating a document, such as a letter, on a personal computer and sending the document to a fax driver. The user then provides recipient information, such as the recipient's name, fax number, number of pages, and any other information supported by the fax driver. The fax driver then generates a cover page based on the provided information and merges the cover page and the user document into a fax job. The computer's operating system (OS) renders the fax job into a document format specific to the OS, and the fax driver converts the fax job into a fax format and transmits the fax job through a fax modem or through a fax-capable MFP device.

There are drawbacks to this approach. The fax driver must be capable of generating a document (the fax cover page), which is additional functionality that may not be available for some devices. Additionally, it may not be feasible to merge the fax cover page and the document, because the page sizes or other specifications may be different.

Another approach to faxing from a personal computer is to use a dedicated fax utility. For example, a user may create a document to be faxed. The user then launches a separate fax utility wherein the user enters information to populate a fax cover page, attaches the document to be faxed, and sends the document and cover page. Drawbacks to this approach include the need for a separate fax utility program, potential restrictions on the document format that may be attached, and a lengthy and unnatural workflow.

Consequently, there is a need in the art for a faxing solution allows for the creation and transmittal of a fax cover page that does not suffer from the aforementioned shortcomings of current approaches.

SUMMARY

An approach is provided wherein a banner page is detected and modified to insert information appropriate for a fax cover page. According to one embodiment, a user submits a document to the OS printing sub-system with a banner page option enabled. The banner page is processed by a fax cover filter which detects the banner page and modifies the banner page to include fax cover page information. The banner page and the document are then rendered to a specified document format by the printing subsystem and faxed, for example by a MFP.

This approach allows existing capabilities in the printing subsystem to be utilized, thereby alleviating the need for additional software to create and fax a banner page along with a document. Banner pages may be generated as a normal part of a user workflow and will have the same job requirements, such as paper size, as the document to which it is associated.

DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. DOUBLE FILTER FAX COVER PAGE
IV. OPERATIONAL EXAMPLE
V. IMPLEMENTATION MECHANISMS

I. Overview

An approach is provided wherein a banner page is detected and modified to insert information appropriate for a fax cover page. According to one embodiment, a user submits a document to the OS printing sub-system with a banner page option enabled. The banner page is processed by a fax cover filter which detects the banner page and modifies the banner page to include fax cover page information. The banner page and the document are then rendered to a specified document format by the printing subsystem and faxed, for example by a MFP.

This approach allows existing capabilities in the printing subsystem to be utilized, thereby alleviating the need for additional software to create and fax a banner page along with a document. Banner pages may be generated as a normal part of a user workflow and will have the same job requirements, such as paper size, as the document to which it is associated.

II. Architecture

Figure 1:
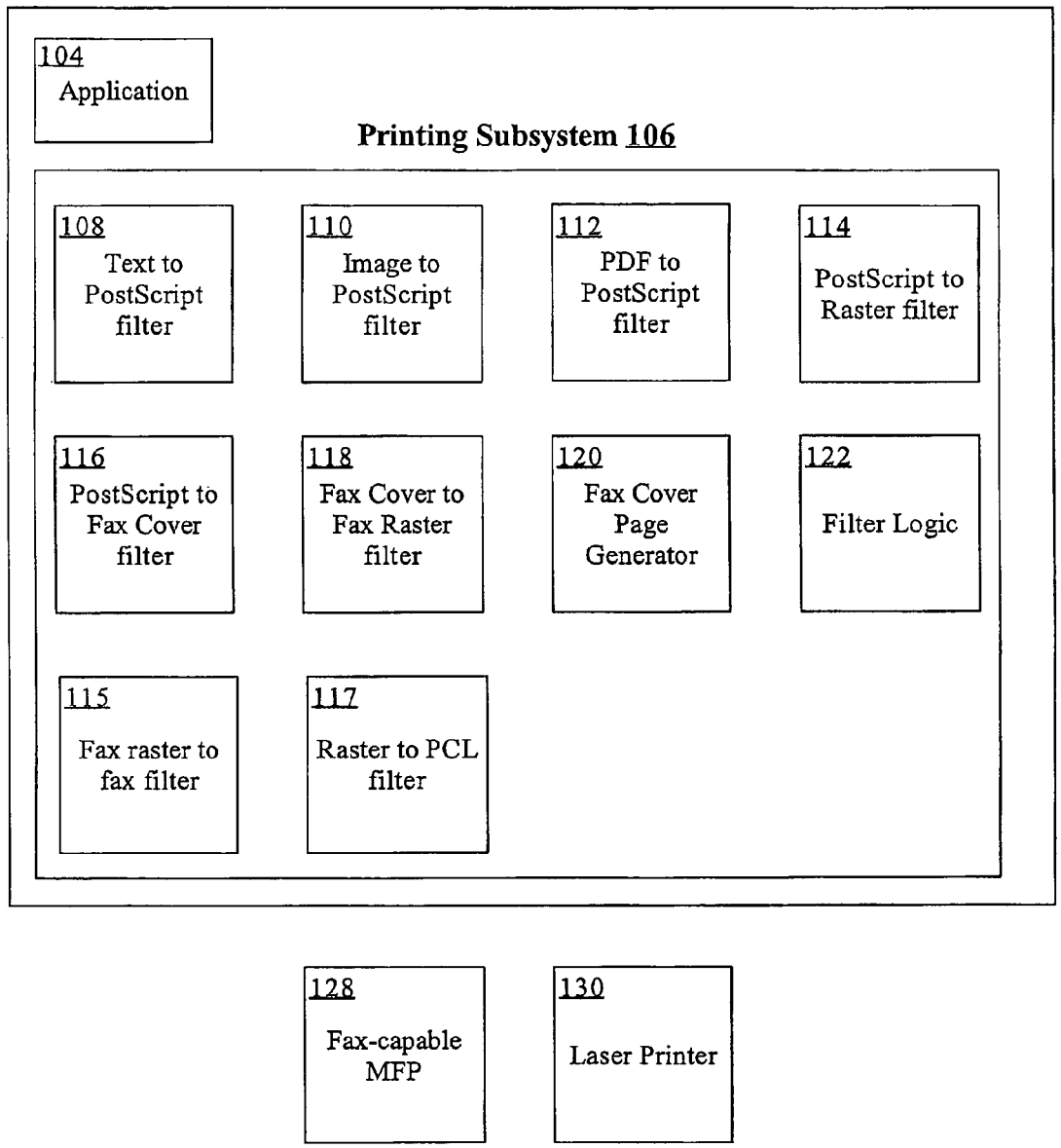
FIG. 1 is a block diagram that depicts an arrangement for a double filter fax cover page according to one embodiment of the invention.

FIG. 1 is a block diagram that depicts an arrangement 100 for a double filter fax cover page according to one embodiment of the invention. Arrangement 100 includes at least one workstation 102 configured with at least one application 104 and a printing subsystem 106. Examples of workstation 102 include, without limitation, a personal computer, a personal digital assistant (PDA), or any type of mobile device. Examples of application 104 include, without limitation, a word processor, a spreadsheet program, an email client, a generic Web browser, a photo management program and a drawing or computer-aided design (CAD) program.

An example of printing subsystem 106 includes, without limitation, the Common Unix Printing System (CUPS). While the example embodiments discussed herein utilize the CUPS printing subsystem, it should be understood that the use of other printing subsystems are envisioned and embodiments of the invention are not limited to utilizing CUPS.

CUPS provides a mechanism that allows print jobs to be sent to output devices 128, 130 in a standard fashion. Output devices in addition to a MFP and laser printer are envisioned. CUPS can process a variety of data formats. It may convert print data into a language or format recognized by an output device 128, 130 via a series of filters 108-118.

CUPS may provide some filters while other filters may be supplied by manufacturers of output devices (third-party filter). Each third party filter registers with CUPS filter logic 122 and becomes part of the CUPS filter collection 108-118.

Each output device 128, 130 indicates to CUPS filter logic 122 what format it supports, and CUPS filter logic 122 constructs a filter chain to convert an application-generated document into the format required by the output device 128, 130.

According to one embodiment, print data is sent as a job from an application 104 to a filter system 108-118 that is part of CUPS and which converts the print job into a format that an output device 128, 130 will understand and from which the output device 128, 130 can cause the document to be printed or faxed.

According to one embodiment, the filters 108-118 accept input data and convert the data to one of several formats. According to one embodiment, there may be a text to PostScript filter 110 that receives text data, converts the text data to PostScript and outputs the result to another filter or perhaps an output device 128, 130. Other examples of filters that may be included in the printing subsystem 106 include image data to PostScript 110, PDF to PostScript 112 and PostScript to raster 114. According to an embodiment, there is a PostScript to Fax Cover filter 116 and a Fax Cover to Fax Raster filter 118. In one embodiment, a filter logic component 122 controls the flow of data between the filters 108-122 and decides how to send the document through the filter modules 108-118 in order to convert the document into a format expected by the selected output device 128, 130.

In an example illustrating a common approach to printing a document, application 104 generates a text file to be printed by output device 128, 130 which in this example is a standard laser printer 130 that takes as input a file in PCL format and creates a printed copy of the document as described by the PCL input. The text file is sent from the application 104 to the printing subsystem 106 which in this example is CUPS. The filter logic component 122 determines that the incoming file is text and is destined for a printer than accepts PCL as input. The filter logic component 122 sends the text file to the text to PostScript filter 108. In this example, the laser printer 130 expects to receive data in PCL format. Because the laser printer 130 needs PCL input, the filter logic component 122 sends the PostScript output from the text to PostScript filter 108 to the PostScript to raster filter 114. The raster output is then sent to the raster to PCL filter 117, which converts the raster input to PCL. The PCL output is sent to the laser printer 130 and printed. This chain of filters in the above example is necessary because there is no text to PCL filter.

III. Double Filter Fax Cover Page

Many printing subsystems, including CUPS, provide an option to include a banner page with a print job. The banner page is generated by the printing subsystem 106 and may include such information as the user name submitting the print job, the time the print job was submitted and the name of the workstation from which the print job originated. One object of the banner page is to prevent confusion at a printer regarding which documents belong to which user. For example, user A prints a document with a banner page. The banner page is printed first and includes text identifying user A, and the document follows. Then, user B prints a document with a banner page. When users A and B go to the printer to collect their respective documents, they may look at the banner page to identify which document is theirs; the document following the banner page with user A's name is user A's document, and vice versa.

According to one embodiment, a banner page is submitted as a separate job to the printing subsystem 106 before the user document is submitted, and the banner page and the user document will have the same print job options; for example, paper size and orientation. The banner page may be generated in one of several formats, such as PostScript.

According to one embodiment, when a banner page is submitted in PostScript format for a fax job, a fax cover filter 116 is provided that determines whether the incoming file is a banner page and if so, calls a fax cover page generator module 120 that modifies data on the banner page to create a fax cover sheet. According to an embodiment, text contained in the banner page is substituted with alternate text, such as a fax number or intended recipient. This alternate text, or substitution text, may be user-defined or automatically generated by the operating system or printing subsystem. According to an embodiment, the fax cover page generator module 120 may replace the banner page with a fax cover sheet.

According to an embodiment, the printing subsystem may automatically detect the presence of the fax cover filter. Alternate embodiments are envisioned wherein the fax cover filter 116 performs the tasks herein ascribed to the fax cover page generator 120 While this example embodiment utilizes a PostScript to fax cover filter 116, it is envisioned that one or several fax cover filters may exist, each accepting one or more data formats, and banner pages may be created in PostScript format or another format.

According to an embodiment, the fax cover filter 116 determines that the input is a banner page by examining the title given to the document by the printing subsystem 106. Alternate embodiments are envisioned wherein the fax cover filter 116 uses alternate approaches to identify a banner page, including but not limited to examining the structure of the data comprising the banner page, identifying an alternate notation given to the file comprising the banner page, examining the file size of the banner page or identifying a specific string in the banner page or a flag accompanying the data.

According to an embodiment, the fax cover filter 116 may receive input from the user comprising information to be placed on the banner page by the fax cover page generator 120. This information will allow the banner page to serve as a fax cover page. For example, a user may provide information on the command line along with the command to send the document to the fax-capable MFP 128; this information may include, but is not limited to, sender name and phone number, recipient name and fax number, and number of pages sent. According to an alternate embodiment, this information may be provided via a graphical user interface (GUI) element such as a dialog box that appears in response to a command to fax a document. Using this approach, a user may input information into a dialog box or otherwise select information that is then sent to the fax cover filter 116 and then to the fax cover page generator 120 to populate the fax cover page. Alternate embodiments are envisioned including, but not limited to, wherein the information to populate the fax cover page is automatically retrieved from a selected file by the fax cover filter 116 or an existing fax cover sheet is selected to replace the banner page. According to an embodiment, this information is populated on the fax cover page using the same approach with which user information is populated on a banner page. For example, the pre-existing fields on a banner page that normally would be populated with banner page information by the printing subsystem 106 are instead populated with cover page information. If additional fields are necessary, they may be created by the printing subsystem 106, the fax cover filter 116 or the fax cover page generator 120.

Referring to FIG. 1, according to an example embodiment, a user creates a text document via application 104 and chooses to print the document via fax. The user selects a GUI menu item such as "File" and selects a sub-menu option such as "Print." The user chooses to create a banner page, selects a fax model and clicks a button to send the print job. Other workflows and interfaces, such as a command-line interface, may also be used, and this process may be automated in part or in full.

As part of the printing process, a banner page job is created in PostScript format and submitted to the printing subsystem 106 along with the text document print job. According to an embodiment, a user may submit a print job with a flag enabled to indicate the use of a banner page along with fax information, and the printing subsystem 106 would create a banner page job. In this example, a banner page would contain fields for a user name, the time of printing, and name of the workstation from which the print job was submitted. The banner page and user document may then be submitted to the filter chain.

The user, as part of the printing process in this example, provides data intended for the fax cover sheet comprising the sender's name, recipient's name and recipient's fax number. In this example, the printing subsystem 106 creates and submits the banner page job to the filter logic component 122 first. The filter logic component 122 identifies the banner page as being in PostScript format and sends the banner page to the PostScript to fax cover page filter 116. The PostScript to fax cover page filter 116 examines the title of the document and identifies the document as a banner page.

The banner page data is then sent to the fax cover page generator 120, which replaces fields on the banner page with the user-submitted fax cover page information. For example, the user name field on the banner page is replaced with the sender name. The time printed field on the banner page is replaced with the recipient name. The workstation identifier field on the banner page is replaced with the recipient fax number. Other fields and data are envisioned, along with replacing the banner page with a fax cover page.

Once the banner page fields are replaced with the fax cover page information, the banner page (now to be identified as the fax cover page) is sent to a second filter, the fax cover to fax raster filter 118. In this example, this step is required because the fax raster to fax filter 115 only accepts fax raster input and a fax format is required to be output to the MFP 128 or other faxing output device. The output of the fax raster to fax filter 115 is then sent to the MFP 128. Alternate embodiments are envisioned wherein the fax cover filter 116 or fax cover page generator 120 creates output that is acceptable for the MFP 128. According to one embodiment, the fax cover to fax raster filter 118 output may be routed by the filter logic component 122 to a postscript to raster filter 114 in order to create the raster format necessary for the fax raster to fax filter 115.

In this example embodiment, the text document submitted by the user is sent to the text to PostScript filter 108 and then to the PostScript to fax cover filter 116. The PostScript to fax cover filter 116 checks the title of the document and does not identify the document as a banner page job; therefore, the output of the PostScript to fax cover filter 116 is sent to the PostScript to raster filter 114 and then to the fax raster to fax filter 115, and then to the MFP 128. According to an embodiment, the output of the PostScript to fax cover filter 116 is sent to the fax cover to fax raster filter 118, which internally calls the PostScript to raster filter 114. According to an embodiment, the output of the PostScript to fax cover filter 116 is always fax cover format, which is identical to PostScript format, and then may be sent to the fax cover to fax raster filter 118.

According to an embodiment, the fax cover page and the user document are submitted to the MFP 128 as two separate jobs; however, alternate embodiments are envisioned wherein the fax cover page may be stored rather than sent to the MFP 128. The user document is examined to see if it matches the stored fax cover page, the jobs may be merged and the merged job submitted to the MFP 128.

The use of filters in the above-described embodiment is merely an example. Alternate embodiments are envisioned utilizing one or more document formats and one or more filters, and no specific order of filter use or existence of a filter should be inferred.

IV. Operational Example

Figure 2:
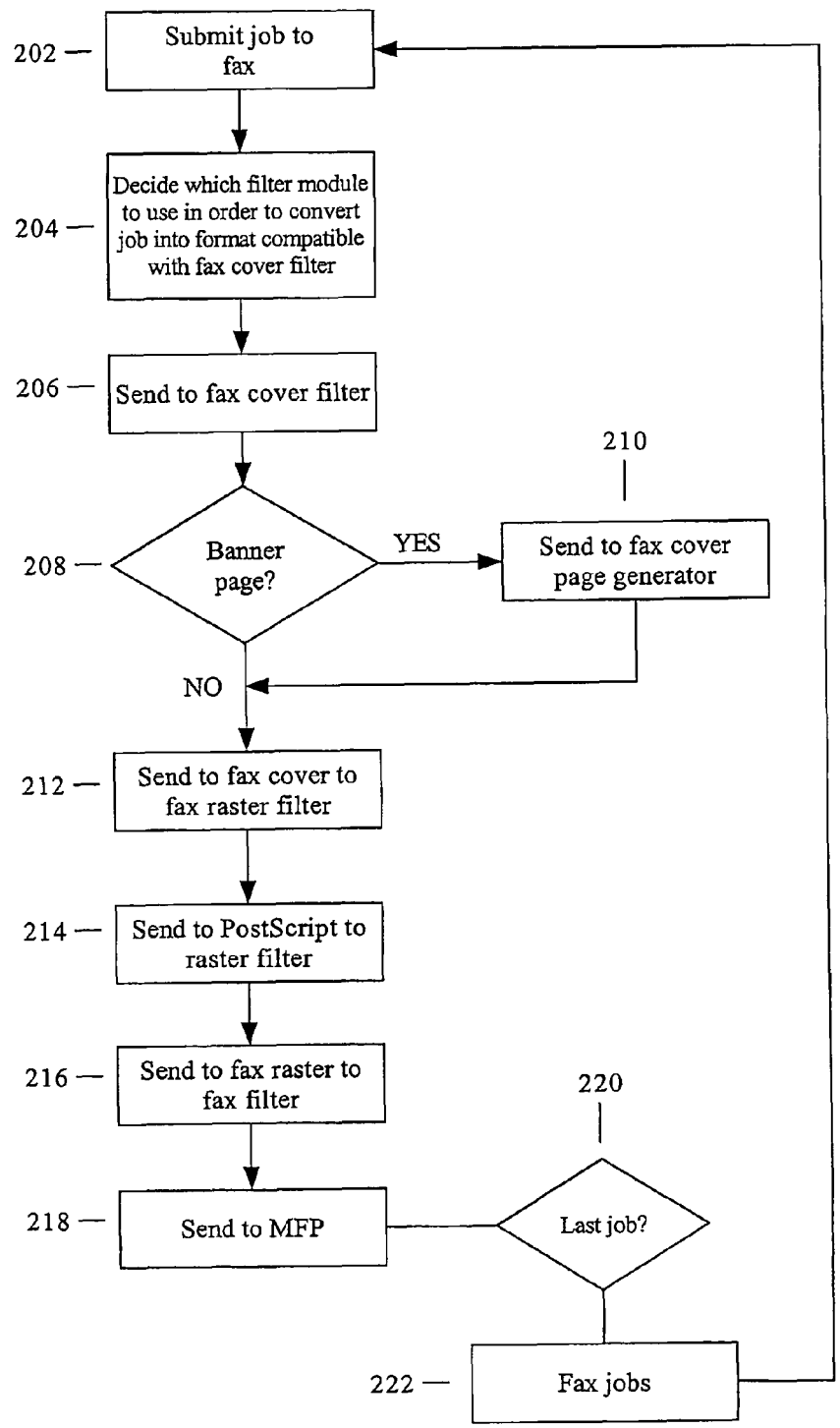
FIG. 2 is a flow diagram that depicts an approach for generating a double filter fax cover page according to an embodiment of the invention.

FIG. 2 is a flow diagram 200 that depicts an approach for generating a double filter fax cover page according to an embodiment of the invention. In step 202, a job is submitted to the faxing device. This may be the banner page job or one of several user document jobs. In step 204, the filter logic 122 decides which filter module, if any, to use in order to convert the job into a format compatible with the fax cover filter. For example, a banner page job submitted in PostScript format may not need any conversion to be accepted by a PostScript to fax cover filter, while a user document submitted in text format may need to be converted into PostScript format to be accepted by a PostScript to fax cover filter.

In step 206, once the necessary conversion is complete, using whichever filter modules are required, the job is sent to the fax cover filter. This may be a PostScript to fax cover filter, a text to fax cover filter, or any variation. In step 208, the fax cover filter determines if the document submitted as input is a banner page. If yes, then in step 210, the job is sent to a fax cover page generator where fax cover page information is inserted or a banner page is replaced by a fax cover page as described above, and then in step 212 the job is sent to the fax cover to fax raster filter. If the job is not a banner page, then in step 212 the job is sent to the fax cover to fax raster filter.

According to an embodiment, in order to complete the rasterization process, the job may be sent to a PostScript to raster filter. For example, the job may be sent to a fax cover to fax raster filter 118, which will invoke the PostScript to raster filter 114. In step 216, the job is sent to a fax raster to fax filter 115, where the job is converted into a format acceptable to the fax-capable MFP. In step 218, the job is sent to a fax-capable MFP. In step 220, a check is made if there are any more jobs to be submitted. If not, in step 222 the jobs processed so far are faxed. If more jobs remain to be submitted, the process starts anew at step 202.

V. Implementation Mechanisms

Figure 3:
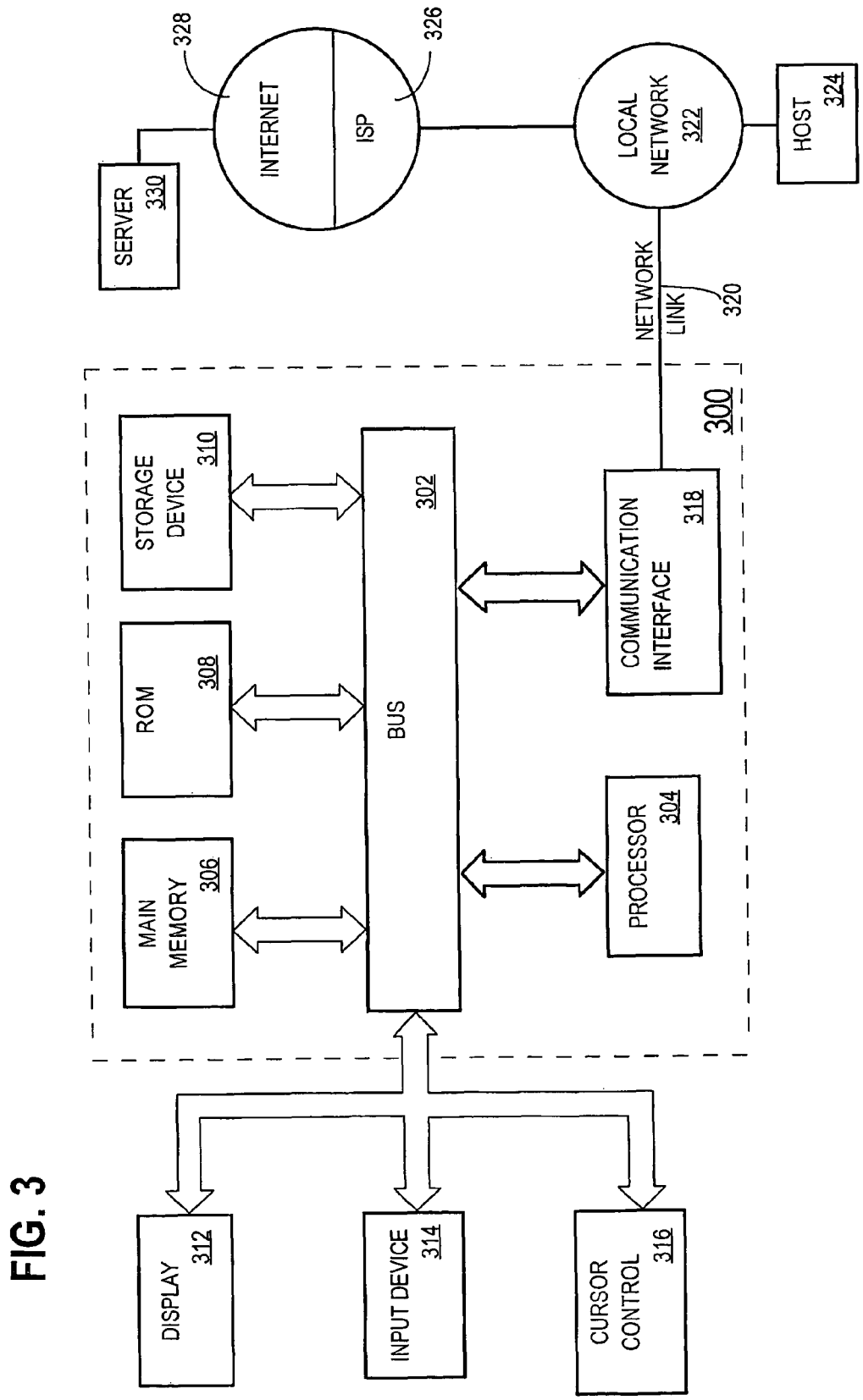
FIG. 3 is a is a block diagram of a computer system on which embodiments of the invention may be implemented

Although primarily described herein in the context of parallel printing, the approach is applicable to any type of network device or element. The approach described herein and the various elements, such as error manager 122, may be implemented in hardware, computer software or any combination of hardware and computer software on any type of computing platform. FIG. 3 is a block diagram that illustrates an example computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing electronic document data, comprising:
    receiving data comprising an electronic document;
    examining the data to determine whether the electronic document comprises a banner page; and
    if the electronic document comprises a banner page, then replacing the banner page with a fax cover page and converting the fax cover page into a format suitable for faxing.

2. The computer-implemented method as recited in claim 1, wherein the examining the data to determine whether the electronic document comprises a banner page is performed by a filter compatible with the Common Unix Printing System.

3. The computer-implemented method as recited in claim 2, wherein the filter is automatically detected.

4. The computer-implemented method as recited in claim 1, wherein the electronic document is in PostScript format.

5. The computer-implemented method as recited in claim 1, wherein the fax cover page identifies at least one of the name of an intended recipient of the electronic document or a telephone number to which the electronic document is intended to be transmitted.

6. The computer-implemented method as recited in claim 5, wherein one or more of the name of the intended recipient of the electronic document and the telephone number to which the electronic document is intended to be transmitted are indicated by user input received via a command-line interface or a graphical user interface.

7. The computer-implemented method as recited in claim 1, wherein the examining the data to determine whether the electronic document comprises a banner page includes comparing a title associated with the electronic document to a specified value.

8. The computer-implemented method as recited in claim 1, wherein the examining the data to determine whether the electronic document comprises a banner page includes comparing one or more headers associated with the document to a specified value.

9. A computer-readable storage medium for processing electronic document data, the computer-readable storage medium storing instructions which, when processed by one or more processors, causes:
    receiving data comprising an electronic document;
    examining the data to determine whether the electronic document comprises a banner page; and
    if the electronic document comprises a banner page, then replacing the banner page with a fax cover page and converting the fax cover page into a format suitable for faxing.

10. The computer-readable storage medium as recited in claim 9, wherein the examining the data to determine whether the electronic document comprises a banner page is performed by a filter compatible with the Common Unix Printing System.

11. The computer-readable storage medium as recited in claim 10, wherein the filter is automatically detected.

12. The computer-readable storage medium as recited in claim 9, wherein the electronic document is in PostScript format.

13. The computer-readable storage medium as recited in claim 9, wherein the fax cover page identifies at least one of the name of an intended recipient of the electronic document or a telephone number to which the electronic document is intended to be transmitted.

14. The computer-readable storage medium as recited in claim 13, wherein one or more of the name of the intended recipient of the electronic document and the telephone number to which the electronic document is intended to be transmitted are indicated by user input received via a command-line interface or a graphical user interface.

15. The computer-readable storage medium as recited in claim 9, wherein the examining the data to determine whether the electronic document comprises a banner page includes comparing a title associated with the electronic document to a specified value.

16. The computer-readable storage medium as recited in claim 9, wherein the examining the data to determine whether the electronic document comprises a banner page includes comparing one or more headers associated with the document to a specified value.

17. An apparatus for processing electronic document data, the apparatus comprising a storage medium storing instructions which, when processed by one or more processors, causes:
    receiving data comprising an electronic document;
    examining the data to determine whether the electronic document comprises a banner page; and if the electronic document comprises a banner page, then replacing the banner page with a fax cover page and converting the fax cover page into a format suitable for faxing.

18. The apparatus as recited in claim 17, wherein the examining the data to determine whether the electronic document comprises a banner page is performed by a filter compatible with the Common Unix Printing System.

19. The apparatus as recited in claim 18, wherein the filter is automatically detected.

20. The apparatus as recited in claim 17, wherein the electronic document is in PostScript format.

21. The apparatus as recited in claim 17, wherein the fax cover page identifies at least one of the name of an intended recipient of the electronic document or a telephone number to which the electronic document is intended to be transmitted.

22. The apparatus as recited in claim 21, wherein one or more of the name of the intended recipient of the electronic document and the telephone number to which the electronic document is intended to be transmitted are indicated by user input received via a command-line interface or a graphical user interface.

23. The apparatus as recited in claim 17, wherein the examining the data to determine whether the electronic document comprises a banner page includes comparing a title associated with the electronic document to a specified value.

24. The apparatus as recited in claim 17, wherein the examining the data to determine whether the electronic document comprises a banner page includes comparing one or more headers associated with the document to a specified value.

* * * * *